Figure 1:
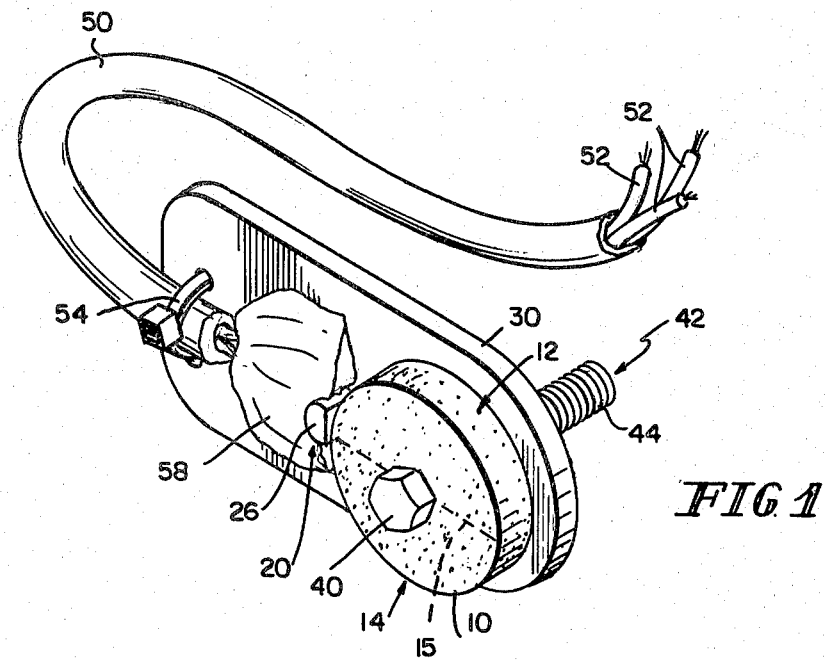

United States Patent [19]

Penn

[11] 4,376,915
[45] Mar. 15, 1983

[54] TACHOMETER

[75] Inventor: Paul E. Penn, Indianapolis, Ind.

[73] Assignee: Dart Controls, Inc., Zionsville, Ind.

[21] Appl. No.: 248,941

[22] Filed: Mar. 30, 1981

[51] Int. Cl.³ .......................... G01P 3/48; G01P 3/54
[52] U.S. Cl. .................................... 324/168; 73/519;
324/174; 340/671
[58] Field of Search .................... 324/168, 167, 174;
340/671; 73/519

[56] References Cited

U.S. PATENT DOCUMENTS

| 3,447,034 | 5/1969 | Smith | 324/174 X |
|---|---|---|---|
| 3,548,663 | 12/1970 | Radin | 324/174 X |
| 3,683,219 | 8/1972 | Kruse | 324/174 X |
| 3,719,841 | 3/1973 | Ritsema | 324/174 X |
| 3,739,211 | 6/1973 | Hasler | 324/174 X |
| 3,787,807 | 1/1974 | Anselmino et al. | 324/174 X |
| 3,805,161 | 4/1974 | Bayha et al. | 324/174 X |
| 3,898,563 | 8/1975 | Erisman | 324/174 X |
| 4,257,040 | 3/1981 | Shirasaki et al. | 324/174 X |
| 4,266,192 | 5/1981 | Ohtani | 324/168 |

OTHER PUBLICATIONS

Clark, Rotary Tachometer/Encoder, IBM Technical Disclosure Bulletin, vol. 18, No. 9, Feb. 1976, p. 2787.

Primary Examiner—Stanley T. Krawczewicz
Attorney, Agent, or Firm—Barnes & Thornburg

[57] ABSTRACT

A tachometer comprises a magnet having north and south magnetic poles and a magnetically operated switch for sensing movement of the magnet and for producing an output signal in response thereto. The magnet is supported on one end of a shaft which is supported for rotation in a bearing. The other end of the shaft is threaded into the rotating member, the output of which is to be measured. The bearing is mounted on a plate so that the plate and shaft are independently movable. The switch is mounted on the plate in proximity to the magnet to detect movement of the magnet. The frequency of the output signals produced by the switch indicates the rate of rotation of the rotating member.

8 Claims, 2 Drawing Figures

U.S. Patent   Mar. 15, 1983   4,376,915

TACHOMETER

The present invention relates to tachometers which indicate the rate of rotation of rotating members and, more particularly, to an improved tachometer which is simple and inexpensive to construct and which is easy to use.

Various devices and apparatus for detecting and indicating the rate of rotation of a rotating member, such as the output shaft of a motor, are well known to those skilled in the art. In order to attach these conventional devices to the rotating member, special brackets and mounting provisions must be provided to ensure proper alignment and engagement with the rotating member. These special attachment features increase the overall construction cost and make the installation of these conventional devices difficult for the average consumer. A need exists for a simple low-cost device which can be easily atached to the rotating member to detect its rate of rotation.

One feature of the invention is to provide a tachometer which is simple and inexpensive to construct and which further does not require special mounting and alignment provisions for attachment to a rotating member.

Another feature of the present invention provides a tachometer which provides an output electrical signal, the frequency of which is related to the rate of rotation of a rotating member.

An apparatus embodying the present invention includes a bearing, a shaft supported in the bearing for rotation about its axis, a magnet coupled to one end of the shaft so that the magnet's poles are oriented generally perpendicular to the longitudinal axis of the shaft. The other end of the shaft includes means for engaging a rotating member on its axis of rotation. The bearing is mounted on a plate to provide for the plate's movement independent of the rotation of the shaft. A magnetically operated switch mounted on the plate a predetermined radial distance from the axis of the shaft senses movement of the magnet as the shaft and magnet are rotated by the rotating member. The switch produces an output signal in response to movement of the magnet. The frequency of the output signal produced by the switch is related to the rate of rotation of the rotating member.

Figure 2:
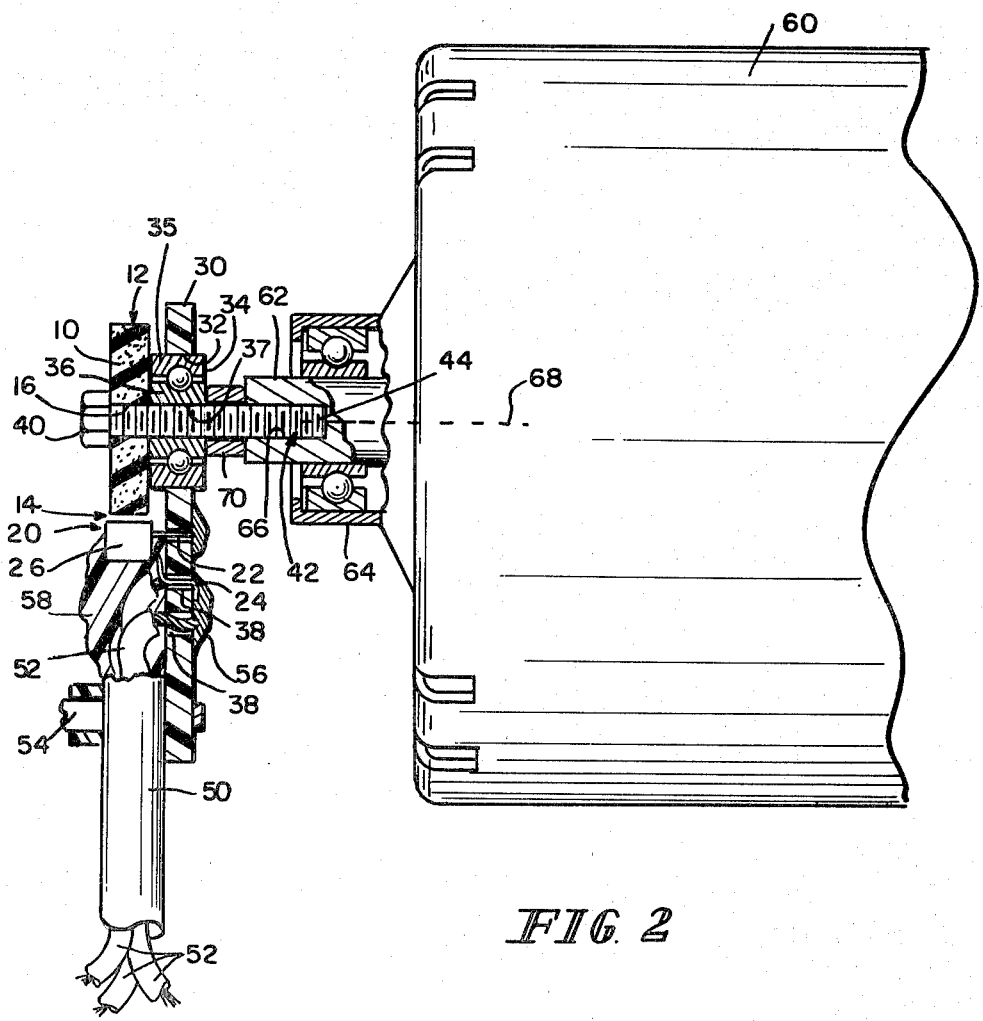

Various features and advantages of the present invention will become apparent in view of the following detailed description of one embodiment thereof, which description should be considered in conjunction with the accompanying drawings, in which:

FIG. 1 is a perspective view of one embodiment of an apparatus embodying the present invention; and FIG. 2 is a side elevational view, partly broken away and partly cross-sectioned, of the apparatus of FIG. 1 shown in one application thereof.

Referring to FIGS. 1 and 2, an apparatus embodying the present invention for detecting the rate of rotation of a rotating member includes a disk-shaped magnet 10 having at least one north pole 12 and at least one south pole 14 which produce a magnetic field around the periphery of the magnet 10. Although for illustrative purposes only one north pole 12 and one south pole 14 have been shown, disk-shaped magnet 10 could have more than one pair of north and south poles spaced radially around the periphery of the disk. In the illustrative embodiment of the magnet 10, the magnetic field is weakest along a line 15 between the north and south poles 12 and 14, respectively. Further, the strength of the magnetic field will be greatest at points spaced equidistant from the ends of the line 15 on the periphery of the magnet 10. As more particularly shown in FIG. 2, a cylindrical opening 16 is provided through the magnet 10 on its central axis. While, for illustrative purposes, a disk-shaped magnet 10 has been shown, it should be understood that magnets of various other shapes may be employed without departing from the scope of the present invention.

The apparatus further includes a magnetically operated electronic switch 20 which utilizes the Hall effect principle to sense magnetic fields and to produce an output signal in response to such characteristic of a magnet 10. Referring more particularly to FIG. 2, the switch 20 includes an input terminal 22 (Vcc), an output terminal 24, and a ground terminal (not shown). Various magnetically operated switches are available. A preferred switch is manufactured by Texas Instruments Incorporated, and identified as TL170C. Although not shown, the switch 20 includes a Hall effect sensor which is encased in a housing 26.

In general, the Hall effect is defined as the development of a transverse electric field in a current-carrying conductor (sensor) placed in a magnetic field. Ordinarily, the conductor is positioned so that the magnetic field is perpendicular to the direction of current flow, and the electric field is developed perpendicular to both the magnetic field and the current flow. The electric field produces a potential difference on opposite sides of the current-carrying conductor which, in the absence of the electric field, would normally be at the same potential.

The magnetically operated switch 20 utilizes the Hall effect principle to sense the change in magnetic flux density of the magnetic field of the magnet 10 and to produce an output signal in response thereto. Magnetic flux density is a vector quantity which is used as a quantitative measure of the strength of a magnetic field. Genarally, in response to a positive-going flux density (either a decreasing negative flux density or an increasing positive flux density), the output of the switch 20 is turned on. In response to a negative-going flux density (either a decreasing positive flux density or increasing negative flux density), the output of the switch 20 is turned off. Therefore, the output of switch 20 will be turned on and off in response to movement of a polarized magnet 10 which produces a change in the magnetic flux density relative to the switch 20.

Continuing to refer to FIGS. 1 and 2, the apparatus further includes a support plate 30. Plate 30 includes a circular opening 32 for mounting a journal or rotary bearing 34 in the plate 30, as best seen in FIG. 2. Bearing 34 includes an outer race 35 secured to plate 30 in opening 32 by conventional means and an inner race 36 rotatable in the outer race 35. The inner race 36 of bearing 34 includes an opening 37 extending axially therethrough. The plate 30 also includes a plurality of small openings 38 which are used for mounting the switch 20 thereto in a manner to be described later.

A shaft or journal 40 is positioned through the opening 16 in the magnet 10 and is supported by the inner race 36 of bearing 34 for rotational movement therewith. The magnet 10 is fixed in position on one end of the shaft 40 so that rotational movement of the shaft 40 with the inner race 36 results in corresponding rotational movement of the magnet 10. The distal end 42 of the shaft 40 is threaded, as indicated at 44, for engaging a rotating member on its axis of rotation.

An electrical connector 50 is mounted to the plate 30 by a mounting strip 54. The connector 50 includes three separate wires 52 encased in a sleeve. One wire 52 is connected to ground, another wire 52 is connected to a power supply source (Vcc), and a third wire 52 is connected to an indicating device or other mechanism which provides an audible or visual signal when the output of the switch 20 is turned on.

The ground terminal (not shown) and terminals 22, 24 of the switch 20 are inserted through the openings 38 to mount the switch 20 to the plate 30. The openings 38 are provided in the plate 30 so that the switch 20 can be mounted to the plate 30 in close proximity to the magnet 10. In the illustrative embodiment, the radial distance from bearing 34 to the switch 20 is slightly greater than the radius of the disk-shaped magnet 10. It can be appreciated that the mounting position of the switch 20 on the plate 30 will be determined by the size and shape of the magnet 10. However, the switch 20 must be mounted sufficiently close to the magnet 10 to sense the magnetic field thereof. The wires 52 are connected to the respective ground terminal and terminals 22, 24 by conventional means such as solder 56. It may also be desirable to cover the electrical connections between the wires 52 and terminals of the switch 20 with an epoxy resin or other adhesive material to fix the position of and protect the electrical connections.

Referring particularly to FIG. 2, the apparatus of the present invention is shown in an application to a motor 60 for detecting the rate of rotation of the output shaft 62 of the motor 60. The motor 60 includes a journal or rotary bearing 64 for rotatably supporting the output shaft 62. A threaded bore 66 is provided in the output shaft 62 which extends longitudinally along the axis of rotation 68 of the shaft 62. Attachment of the apparatus embodying the present invention is accomplished by engaging the threaded shaft 40 with the threaded bore 66 in the output shaft 62 of the motor 60. A thrust bearing 70 may be inserted between the output shaft 62 and the journal bearing 34 supporting the shaft 40. During the attachment of the shaft 40 to the motor 62, plate 30 is movable relative to the motor and the shaft 40 to allow proper alignment and position of the switch 20 relative to the magnet 10. Heretofore, it has been necessary to employ a special structure for mounting the sensing element of the tachometer to the motor casing and aligning it with the output shaft.

The operation of the present invention can best be described by continuing to refer to FIG. 2. As the output shaft 62 of the motor 60 rotates, the shaft 40 and magnet 10 correspondingly rotate. The plate 30 and switch 20 remain stationary during the rotation of shaft 40. The switch 20 is mounted to the plate 30 a predetermined radial distance from the bearing 34 so that as the magnet 10 rotates, the switch 20 remains in close proximity thereto. The switch 20 continuously senses the magnetic flux density of the magnetic field associated with the magnet 10, and the output of the switch 20 is turned on and off during each revolution of the magnet 10 in response to changes in the magnetic flux density. Each time the switch 20 is turned on, a signal is produced. This signal is used to indicate the rate of rotation of the output shaft 62 of the motor 60. The rate of rotation is determined as a function of the frequency with which a signal is produced by the switch 20 within a predetermined period of time. As the speed of the output shaft 62 increases, the number of signals produced by the switch 20 within the predetermined time period will also increase and vice versa.

From the above description, it can be appreciated that the present invention provides a simple and inexpensive apparatus for detecting the rate of rotation of a rotating member. An apparatus embodying the present invention utilizes only one bearing for its operation and does not require special mounting and alignment provisions for attachment to the rotating member. Because of its few parts, the apparatus has a greater reliability than conventional devices, and it may be easily installed within a relatively short period of time.

What is claimed is:

1. A tachometer, comprising a magnet, means for attaching the magnet to a rotating member on the rotating member's axis of rotation so that the magnetic field of the magnet is generally perpendicular to the axis of rotation of the rotating member, rotation of the rotating member resulting in corresponding rotation of the magnet, a plate, the plate including an opening, a bearing in the opening for rotatably coupling the plate to the rotating member, means for sensing movement of the magnet and for producing an output signal related to the rate of rotation of the rotating member, and means for mounting the movement sensing means on the plate in proximity to the magnet, whereby the movement sensing means is movable in an arc and is self-aligned with respect to the magnet.

2. The apparatus of claim 1 wherein the attaching means includes a shaft, one end of which supports the magnet and the other end of which is threaded to engage the rotating member, and the bearing is coupled to the shaft.

3. The apparatus of claim 2 wherein the magnet is disk-shaped and its poles are located about its periphery.

4. A tachometer for a rotating member, comprising a support plate including a bearing, the bearing having an outer race secured to the plate and an inner race rotatable in the outer race, a shaft rotatably supported by the inner race of the bearing, the shaft including means for engaging the rotating member on its axis of rotation, the plate being rotatable relative to the shaft and the shaft being rotatable relative to the plate, a magnet carried by the shaft having north and south magnetic poles, a magnetically operated switch for sensing a change in a magnetic characteristic of the magnet and for producing an output signal in response thereto, and means for mounting the switch on the plate in proximity to the magnet to allow the switch to sense the change in the magnetic characteristic as the magnet is rotated in response to rotation of the rotating member, the number of output signals produced by the switch within a predetermined period of time being indicative of the rate of rotation of the rotating member.

5. A tachometer, comprising a bearing having inner and outer portions movable relative to each other, a shaft supported in the inner portion of the bearing for rotational movement relative to the outer portion thereof, one end of the shaft including means for engaging a rotating member on its axis of rotation, a magnet having north and south poles supported on the other end of the shaft so that the magnet's magnetic field is generally perpendicular to the axis of rotation, a plate mounted to the outer portion of the bearing and movable relative to the shaft and the rotating member, a Hall effect switch for sensing a change in a characteristic of the magnetic field, and means for mounting the switch on the plate in proximity to the magnet to allow the switch to sense the change in the characteristic of the magnetic field as the shaft and magnet are rotated in response to rotation of the rotating member, the switch including an output terminal and producing an output signal when the change in the characteristic is sensed, the frequency of the output signals produced by the switch generally corresponding to the rate of rotation of the rotating member.

6. A tachometer, comprising a first element having a magnetic characteristic, means for attaching the first element to a rotating member on its axis of rotation, rotation of the rotating member resulting in corresponding rotational movement of the first element, a second element for sensing the magnetic characteristic of the first element and producing an output signal in response thereto, means for mounting the second element in a position relative to the first element to periodically sense the magnetic characteristic of the first element as the first element is rotated in response to rotation of the rotating member, and means for coupling the mounting means to the attaching means to allow movement of the mounting means independently of the attaching means, thereby to maintain the position of the second element to the first element during attachment to the rotating member, the coupling means including an opening in the mounting means, a bearing in the opening, the bearing having inner and outer portions movable relative to each other, means for connecting one of the bearing portions to the mounting means and means for conecting the other bearing portion to the attaching means.

7. A tachometer, comprising a plate having an opening, a rotary bearing mounted in the opening, the bearing having an outer race secured to the plate and an inner race rotatable in the outer race, a magnet rotatable with the inner race, connecting means for connecting the magnet to a shaft of a motor for rotation therewith, securing means for securing the inner race to the connecting means, and a Hall effect device mounted on the plate for sensing a change in a magnetic characteristic of the magnet, and periodically producing an output signal in response thereto, the plate being movable relative to the connecting means whereby the Hall effect device is self-aligned with respect to the magnet when the magnet is connected to the shaft.

8. A tachometer, comprising a shaft, means for connecting the shaft to a rotating member on its axis of rotation, a magnet connected to the shaft, a single bearing having an outer race and an inner race, means for securing the shaft to the inner race, a plate, means for securing the plate to the other race, sensing means for sensing a magnetic characteristic of the magnet, and means for mounting the sensing means on the plate in proximity to the magnet whereby, when the shaft is connected to the rotating member, the magnet and sensing means are mounted to the rotating member and the sensing means is self-aligned with respect to the magnet.

* * * * *